US012659977B2

(12) United States Patent　　(10) Patent No.:　US 12,659,977 B2
Sharma et al.　　(45) Date of Patent:　Jun. 16, 2026

(54) COMMUNICATIONS DEVICE, INFRASTRUCTURE EQUIPMENT AND METHODS

(71) Applicant: Sony Group Corporation, Tokyo (JP)

(72) Inventors: Vivek Sharma, Basingstoke (GB); Yassin Aden Awad, Basingstoke (GB); Yuxin Wei, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 311 days.

(21) Appl. No.: 18/289,390

(22) PCT Filed: Apr. 26, 2022

(86) PCT No.: PCT/EP2022/060978
§ 371 (c)(1),
(2) Date: Nov. 3, 2023

(87) PCT Pub. No.: WO2022/238103
PCT Pub. Date: Nov. 17, 2022

(65) Prior Publication Data
US 2024/0244643 A1　　Jul. 18, 2024

(30) Foreign Application Priority Data

May 10, 2021　(EP) ..................................... 21173174

(51) Int. Cl.
*H04W 72/30*　　(2023.01)
*H04W 72/0453*　　(2023.01)
(52) U.S. Cl.
CPC ....... *H04W 72/30* (2023.01); *H04W 72/0453* (2013.01)

(58) Field of Classification Search
CPC ............. H04W 72/30; H04W 72/0453; H04W 28/0215; H04L 12/189; H04L 47/806
See application file for complete search history.

(56) References Cited

U.S. PATENT DOCUMENTS

| 2022/0272662 A1* | 8/2022 | Kim | ...................... | H04W 76/20 |
| 2023/0044962 A1* | 2/2023 | Kim | ...................... | H04W 76/40 |

(Continued)

OTHER PUBLICATIONS

International Search Report and Written Opinion mailed on Aug. 16, 2022, received for PCT Application PCT/EP2022/060978, filed on Apr. 26, 2022, 13 pages.

(Continued)

*Primary Examiner* — Yu-Wen Chang
(74) *Attorney, Agent, or Firm* — XSENSUS, LLP

(57) ABSTRACT

A method including transmitting, by infrastructure equipment of a wireless network, to one or more communications devices an indication that a multicast service can be received on communications resources of a wireless access interface provided by the wireless communications network. The indication includes an indication that the communications resources can be received either according to a first mode of operation in which the communications resources of the multicast service form part of a bandwidth part dedicated for the multicast service with a second bandwidth part dedicated for unicast transmission to or reception from a communications device, or according to a second mode of operation in which the communications resources of the multicast service form part of a bandwidth part which includes communications resources for unicast transmission to or reception from a communications device.

20 Claims, 10 Drawing Sheets

(56) References Cited

U.S. PATENT DOCUMENTS

| | | | | |
|---|---|---|---|---|
| 2023/0199739 A1* | 6/2023 | Zhou | ................. | H04W 72/0453 |
| | | | | 370/329 |
| 2023/0231692 A1* | 7/2023 | Baek | .................... | H04W 72/30 |
| | | | | 370/329 |
| 2023/0371046 A1* | 11/2023 | Babaei | ............. | H04W 72/0457 |
| 2024/0080707 A1* | 3/2024 | Shrivastava | ......... | H04W 72/23 |
| 2024/0129785 A1* | 4/2024 | Chai | .................... | H04W 76/15 |
| 2024/0196173 A1* | 6/2024 | Chen | ................... | H04W 72/121 |

OTHER PUBLICATIONS

Mediatek Inc., "Summary of Bandwidth Part Operation", 3GPP TSG RAN WG1 Meeting 90bis, R1-1718901, Oct. 9-13, 2017, 14 pages.
3GPP, "Architectural enhancements for 5G multicast-broadcast services; Stage 2 (Release 17)", 3GPP TS 23.247 V0.2.0, Apr. 2021, pp. 1-53.
3GPP, "NR; NR and NG-RAN Overall Description; Stage 2 (Release 16)", 3GPP TS 38.300 V16.5.0, Mar. 2021, pp. 1-151.
Catt, "Discussion on group scheduling mechanism for RRC_CONNECTED UEs in MBS", 3GPP TSG RAN WG1 Meeting #104-e, R1-2100354, Jan. 25-Feb. 5, 2020, 11 pages.
CMCC, "Discussion on group scheduling mechanisms", 3GPP TSG RAN WG1 Meeting #104b-e, R1-2102900, Apr. 12-20, 2021, 13 pages.
Holma et al., "LTE for UMTS OFDMA and SC-FDMA Based Radio Access", John Wiley & Sons, 2009, 4 pages.
Huawei et al., "Resource configuration and group scheduling for RRC_CONNECTED UEs", 3GPP TSG RAN WG1 Meeting #102-e, R1-2005249, Apr. 17-28, 2020, 5 pages.
Nokia et al., "Revised SID: Study on NR Industrial Internet of Things (IoT)", 3GPP TSG RAN meeting #81, RP-182090, Sep. 10-13, 2018, 5 pages.

* cited by examiner

S502 — Service Announcement

S504 — UE Session Join

S506 — Session Establishment

S508 — Data Transfer

S510 — UE Session Leave

S512 — Session Release

COMMUNICATIONS DEVICE, INFRASTRUCTURE EQUIPMENT AND METHODS

CROSS-REFERENCE TO RELATED APPLICATIONS

The present disclosure is based on PCT filing PCT/EP2022/060978, filed on Apr. 26, 2022, which claims priority to European Patent Application No. 21173174.0, filed on May 10, 2021, the content of each is incorporated herein by reference in its entirety.

BACKGROUND

Field

The present disclosure relates to communications devices, infrastructure equipment and methods for the provision of services in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example, it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a method of operating an infrastructure equipment forming part of a wireless communications network. The method comprises transmitting, by the infrastructure equipment, to one or more communications devices an indication that a multicast service can be received on communications resources of a wireless access interface provided by the wireless communications network. The indication includes an indication that the communications resources can be received either according to a first mode of operation in which the communications resources of the multicast service form part of a bandwidth part dedicated for the multicast service with a second bandwidth part dedicated for unicast transmission to or reception from a communications device, or according to a second mode of operation in which the communications resources of the multicast service form part of a bandwidth part which includes communications resources for unicast transmission to or reception from a communications device. The infrastructure equipment receives a request to establish a communications session from one of the communications devices using either the first mode of operation or the second mode of operation. The infrastructure equipment transmits data according to the multicast service via the communications resources of the wireless access interface provided for the multicast service according to either the first mode or the second mode.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Figure 1:
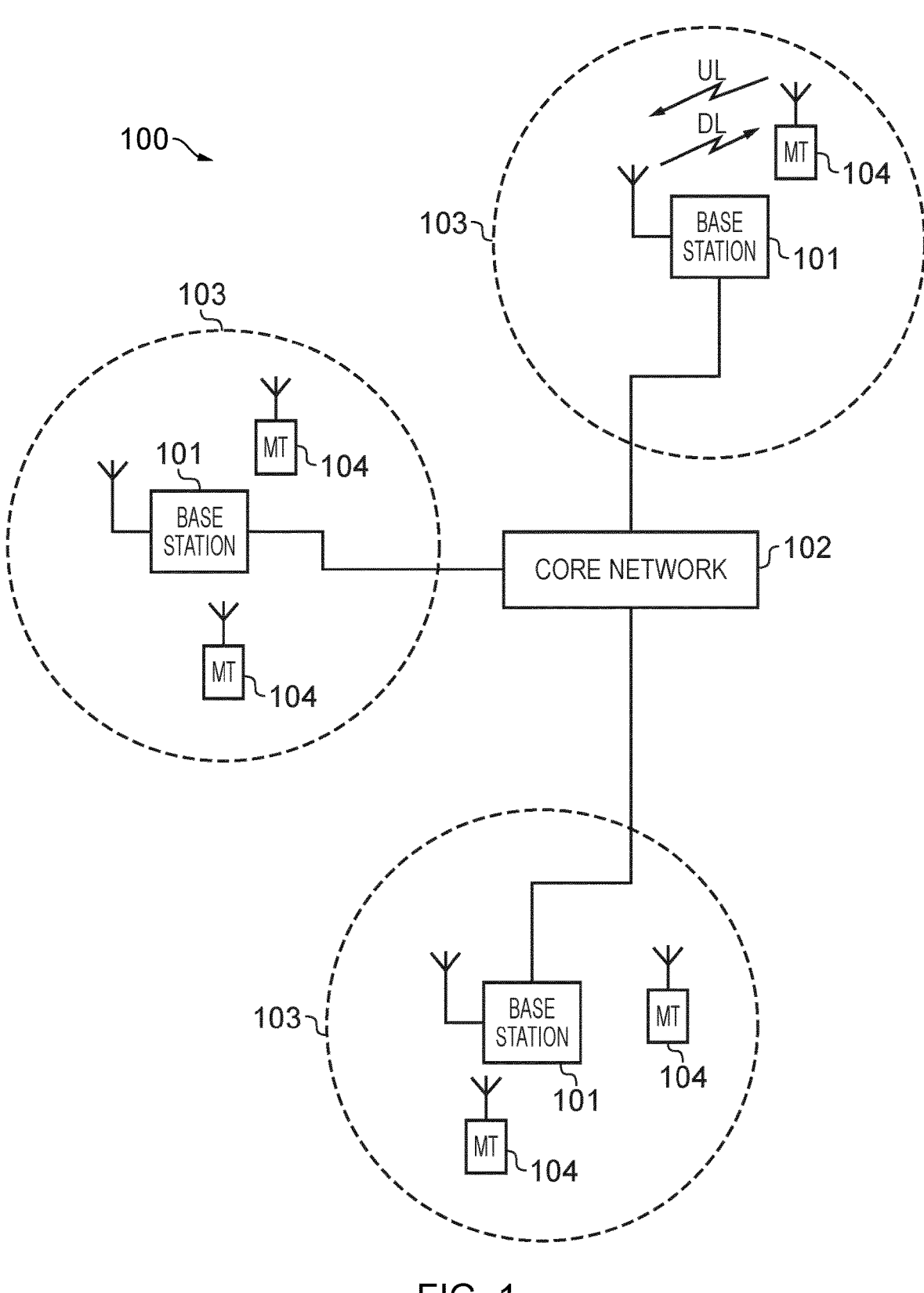
FIG. 1 schematically represents some aspects of an LTE-type wireless telecommunication system which may be configured to operate in accordance with certain embodiments of the present disclosure.

Long Term Evolution Advanced Radio Access Technology (4G) FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example. Holma H, and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Downlink data is transmitted from the base stations 101 to the communications devices 104 within their respective coverage areas 103 via a radio downlink. Uplink data is transmitted from the communications devices 104 to the base stations 101 via a radio uplink. The core network part 102 routes data to and from the communications devices 104 via the respective base stations 101 and provides functions such as authentication, mobility management, charging and so on.

Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
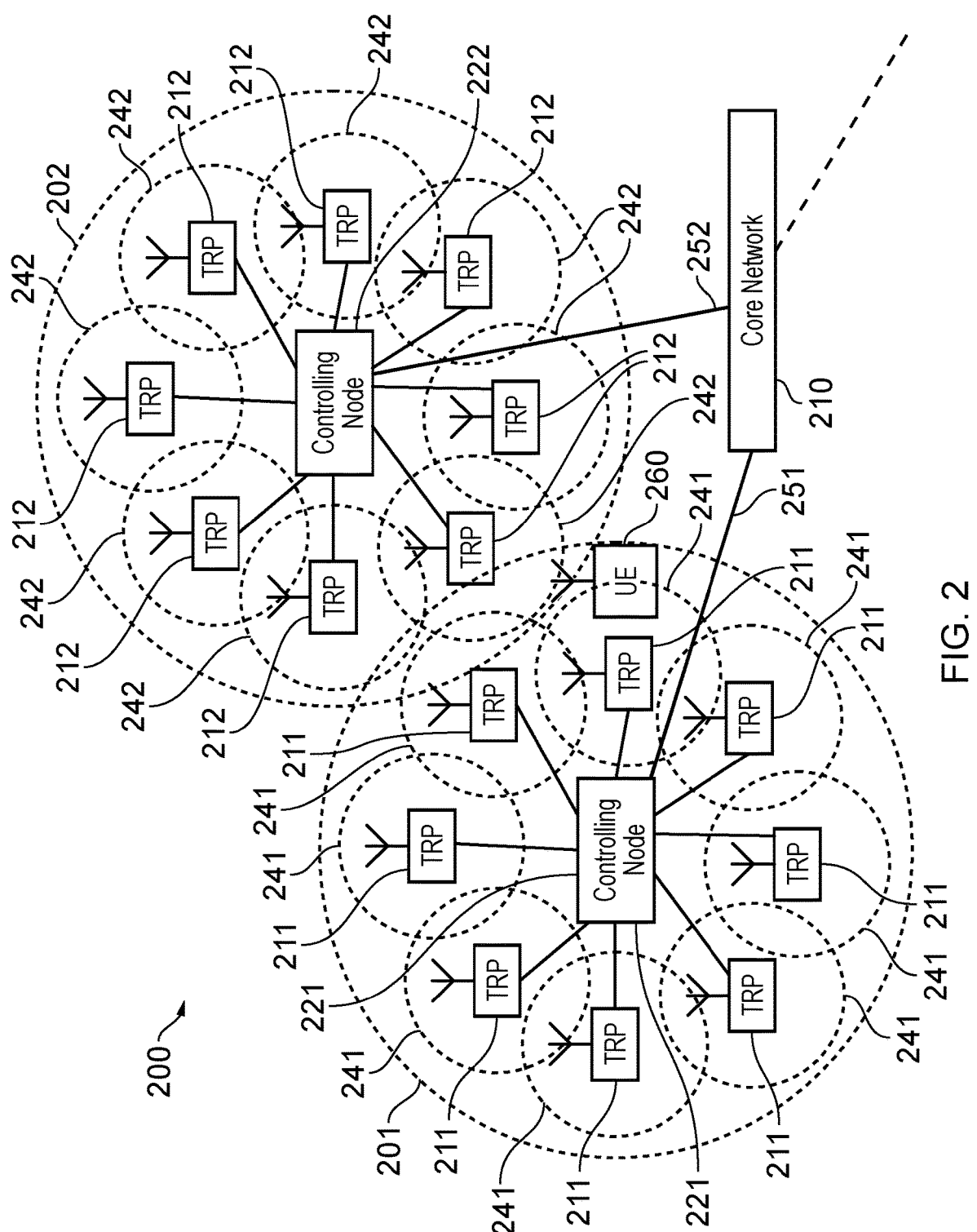
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand.

For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
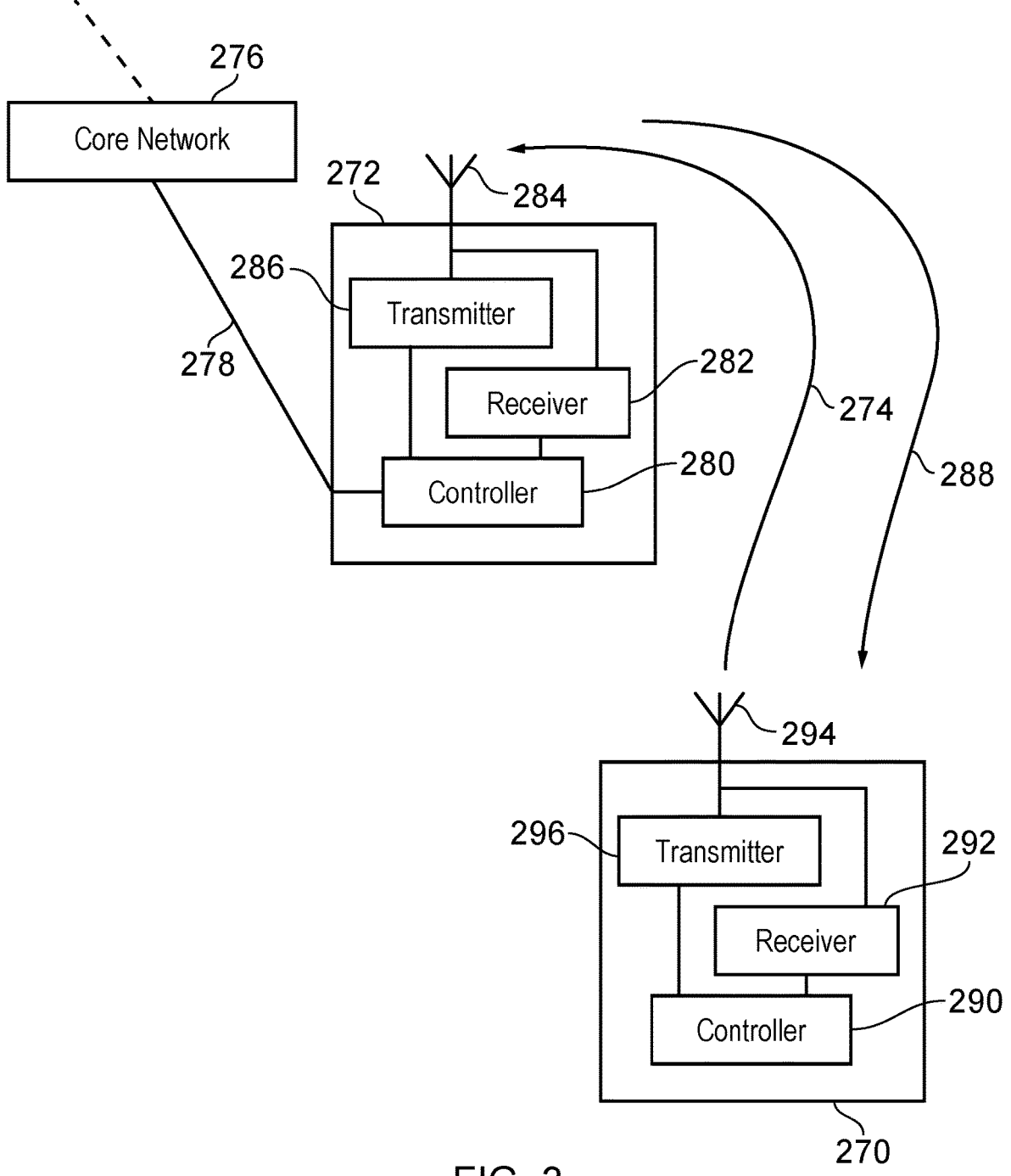
FIG. 3 is a schematic block diagram of an example infrastructure equipment and communications device which may be configured in accordance with example embodiments.

A more detailed illustration of a UE/communications device 270, which may correspond to a communications device such as the communications device 260 of FIG. 2 or the communications device 270 of FIG. 1) and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via uplink resources of a wireless access interface as illustrated generally by an arrow 274 from the UE 270 to the infrastructure equipment 272. The UE 270 may similarly be configured to receive downlink data transmitted by the infrastructure equipment 272 via downlink resources as indicated by an arrow 288 from the infrastructure equipment 272 to the UE 270. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry, which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications 30 systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for case of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for case of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Bandwidth Parts (BWP)

A communications device, such as the communications device/mobile terminal 104 of FIG. 1, the communications device/UE 260 of FIG. 2, or the communications device 270 of FIG. 3 can be configured to communicate via a wireless access interface. The communications is with an infrastructure equipment, such as the infrastructure equipment/base station 101 of FIG. 1, infrastructure equipment (TRP) 211, 212 of FIG. 2, or infrastructure equipment 272 of FIG. 3.

In the following description, reference will be made to the communications device 270 of FIG. 3 and infrastructure equipment 272 of FIG. 3, merely for conciseness.

The wireless access interface may comprise one or more carriers, each providing, within a range of carrier frequencies, communications resources for transmitting and receiving signals according to a configuration of the wireless access interface. The one or more carriers may be configured within a system bandwidth provided for the wireless communications network of which the infrastructure equipment 272 forms part. Each of the carriers may be divided in a frequency division duplex scheme into an uplink portion and a downlink portion and may comprise one or more bandwidth parts (BWPs).

A carrier may be configured therefore with a plurality of different BWPs for a communications device to transmit or receive signals. The nature of the wireless access interface may be different amongst the different BWPs. For example, where the wireless access interface is based on orthogonal frequency division multiplexing, different BWPs may have different sub-carrier spacing, symbol periods and/or cyclic prefix lengths. BWPs may have different bandwidths.

By configuring BWPs appropriately, the infrastructure equipment may provide BWPs which are suited for different types of services. For example, a BWP more suitable for eMBB may have a larger bandwidth in order to support high data rates. A BWP suited for URLLC services may use a higher sub-carrier spacing and shorter slot durations, in order to permit lower latency transmissions. Parameters of the wireless access interface which are applicable to a BWP may be referred to collectively as the numerology of a BWP. Examples of such parameters are sub-carrier spacing, symbol and slot durations and cyclic prefix length.

A BWP may comprise communications resources for uplink (UL) and/or downlink (DL) communications. In some examples uplink and downlink communications resources are separated in frequency, in which case frequency division duplexing (FDD) may be used. Where FDD is used, a UL BWP and a DL BWP may comprise two non-contiguous frequency ranges, one comprising communications resources for uplink communications and one comprising communications resources for downlink communications.

In some examples, a bandwidth part may comprise uplink and downlink communications resources separated in time, in which case time division duplexing (TDD) may be used.

In the remainder of the present disclosure, the term "bandwidth part" (BWP) is used to refer to a pair of associated uplink and downlink bandwidth parts operating using FDD, or a single BWP operating using TDD. As such, a bandwidth part may comprise communications resources for both uplink and downlink transmissions. The terms 'uplink bandwidth part' and 'downlink bandwidth part' will be used where appropriate to refer to a bandwidth part comprising only, respectively, uplink communications resources and downlink communications resources.

A communications device may be configured with one or more BWPs. The configuration may be by means of, for example, RRC signalling, the signalling indicating the frequency range and numerology of the BWP. A BWP may remain configured irrespective of radio resource control (RRC) state changes. Accordingly, for example, configured BWPs may remain configured even if the RRC state changes from a connected mode to an idle mode.

A configured BWP may be either an activated BWP or a deactivated BWP. An activated BWP refers to a BWP which may be used for the transmission or reception of data to or from the communications device 270. The infrastructure equipment 272 may schedule transmissions to or by the communications device only on a BWP if that BWP is currently activated for the communications device. On deactivated BWPs, the communications device is not required to monitor any control channel (such as a PDCCH) and is not required to transmit on any uplink communications resources (such as associated with a PUCCH, a PRACH or UL-SCH).

Conventionally at most one BWP may be activated at any given time in respect of a particular communications device. However, it is possible for a communications device to support more than one activated BWP at the same time as discussed in our co-pending PCT Application with Application Number: PCT/EP2021/050919 which is hereby incorporated by reference.

In light of the differing parameters which may be applicable to BWPs, a single activated BWP may not be suitable for the transmission of data associated with different services, if those different services have different requirements (e.g. latency requirements) or characteristics (e.g. bandwidth/data rate).

A configured BWP may be designated as a default BWP. A default BWP is one that a UE falls back to when an inactivity timer, associated with a BWP other than the default BWP, expires. For example, where a non-default BWP is deactivated as a result of an associated inactivity timer expiring, and no other non-default BWP is activated, then a default BWP may be activated in response. A default BWP may have an activation or deactivation priority which differs from the activation or deactivation priority of other, non-default. BWPs. A default BWP may be preferentially activated and/or may be deactivated with lowest preference. For example, a default BWP may remain activated unless and until a further BWP is to be activated such that a maximum number of activated BWPs would be exceeded. A default BWP may further be preferentially used for transmitting an indication that a different BWP is to be activated or de-activated.

Figure 4:
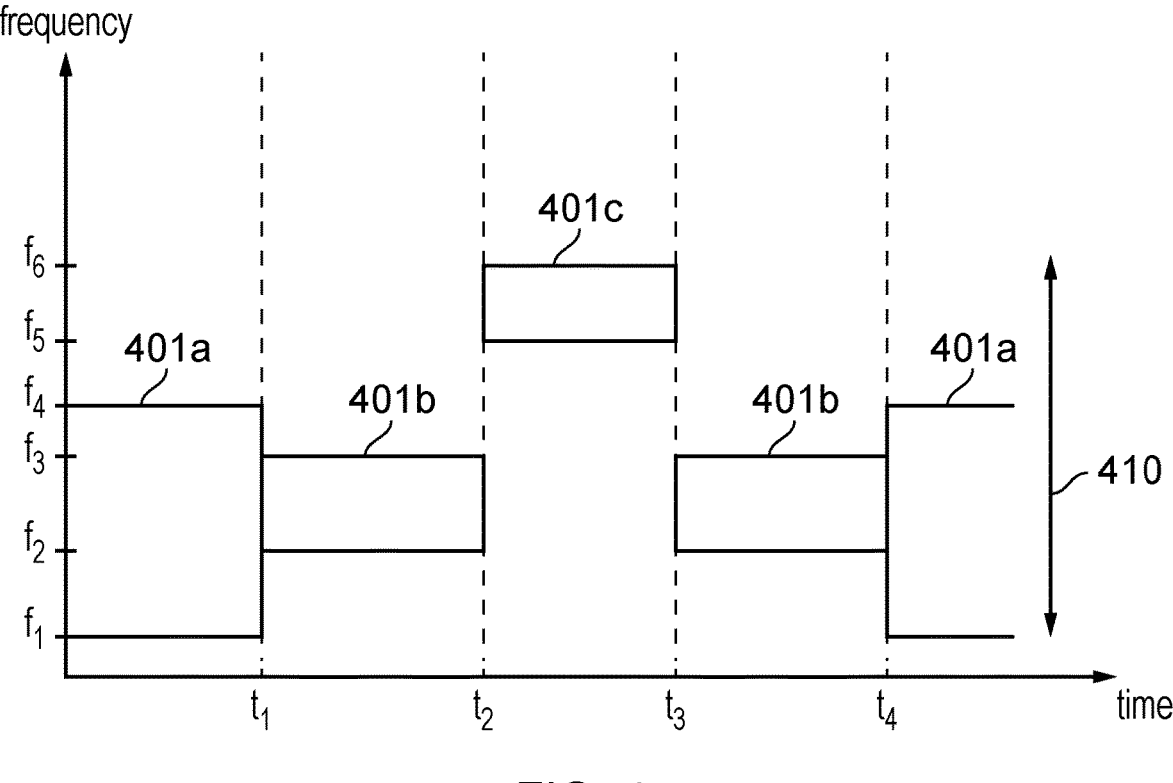
FIG. 4 illustrates an example of an arrangement of bandwidth parts within a carrier of a wireless communications network.

FIG. 4 shows an example of first to third downlink BWPs 401a-c configured within a downlink portion of a system bandwidth 410 extending from frequency f1 to frequency f6. The system bandwidth 410 may also be referred to as a carrier bandwidth. The following Table 1 provides a summary of the characteristics of each of the BWPs 401a-c:

TABLE 1

| Summary of BWP characteristics | | | |
| --- | --- | --- | --- |
| BWP | Index (bwp-id) | Frequency range | Sub-carrier spacing |
| 401a | 1 | f1-f4 | 15 kHz |
| 401b | 2 | f2-f3 | 15 kHz |
| 401c | 3 | f5-f6 | 60 kHz |

As shown in Table 1, each BWP may be identified by an index number (bwp-id).

In the example in FIG. 3, the BWPs 401*a-c* do not collectively span the entire downlink portion of the system bandwidth 410. However, in some examples, the frequency range of one or more BWPs collectively span the system bandwidth (in other words, all frequencies in the system bandwidth may fall within at least one BWP). A frequency range of a BWP may be entirely within the frequency range of another BWP (in this case, the second BWP 401*b* is within the bandwidth of the first BWP 401*a*).

In some embodiments of the present technique, the system bandwidth 410 may be identified by a cell identifier, and all BWPs configured within the same system bandwidth 410 accordingly are associated with the same cell identifier.

In some embodiments, a first BWP of the system bandwidth 410 may be used for the transmission of system information and broadcast control information (such as a multicast control channel, MCCH).

Certain principles which may be applicable to the operation bandwidth parts in embodiments of the present technique are set out in [3].

Multicast/Broadcast Services

Many services provided to wireless communications devices are unicast services. With a unicast service, only a single communications device receives the service, which may be a voice call, a data transfer, or the use of a point-to-point messaging service.

A multicast and broadcast service (MBS) allows multiple devices to receive the same service simultaneously. An example of a multicast service is a group voice call, in which the same voice content is received simultaneously by multiple communications devices within a particular group. An example of a broadcast service is a streaming service, such as an audio or video broadcast, which can be received and decoded, simultaneously, by all capable communications devices within a particular coverage area. As broadcast services are provided to all capable communications devices within a particular coverage area, the communications devices are not required to signal to the wireless communications network in order to join a broadcast session which offers a broadcast service for the coverage area. In other words, the communications devices may receive and decode a configuration of resources for the broadcast session (for example, in system information blocks (SIBs) or in a Multicast Control Channel (MCCH)) and subsequently receive the broadcast session on the configured resources (for example, in a Multicast Traffic Channel (MTCH)), without the communications devices signalling to the wireless communications network. By contrast, a multicast service (which will typically have higher Quality of Service (QOS) requirements than broadcast services), is provided to multiple, selected communications devices within the coverage area. The selected communications devices are typically required to signal to the wireless communications network to join a multicast session offering a multicast service for the coverage area.

Receiving (or providing) a service in this context may comprise the use of uplink transmissions, downlink transmissions or both. The provision of an MBS may be exclusively by means of downlink transmissions, although in some examples, a communications device receiving the MBS may be required to transmit information in the uplink, for example relating to feedback and/or measurement reports.

In the present description, the terms unicast, broadcast and multicast are used in the context of a particular wireless communications network, or a portion thereof (such as a single cell). Thus, for example, when a single user in a cell accesses a streaming service from a third party server outside of the wireless communications network, this may be considered to be (for the present purposes) a unicast service, even though the third party server may permit simultaneous access to multiple devices (even within the same cell) by means of multiple respective connections which are, from the perspective of the wireless communications network, unicast connections. The terms multicast and broadcast as used herein therefore may relate to the case where it is the radio access network and/or core network of the wireless communications network which enable the reception of the service by two or more devices simultaneously.

Multicast/Broadcast services thus can efficiently provide the same service to multiple users within the wireless communications network, by using fewer communications resources (on a wireless access network and/or on internal connections within the wireless communications network) than would be required to provide the same service to multiple users by means of unicast connections.

Multiple MBS services may be available at a given time. In order to conserve communications resources, data associated with an MBS service may be transmitted in a cell only if the corresponding infrastructure equipment 272 is aware of at least one communications device 270 in the cell which is configured to attempt to receive and decode the data associated with the MBS service. A communications device may be configured as such based on a user interaction, a pre-configuration or by any other means.

It is generally desirable that a communications device be capable of receiving one or more unicast services in parallel with receiving an MBS. For example, a user of a communications device may wish to receive a live audio stream, which is being broadcast, while using a messaging service via a unicast data connection. In another example, communications circuitry in a motorised vehicle may receive a multicast service using Vehicle-to-Everything (V2X) technology while simultaneously receiving unicast entertainment services.

However, infrastructure equipment in a wireless communications network may schedule transmissions associated with the MBS on a BWP which is different from the one on which the communications device is receiving the unicast service. Moreover, depending on the receiver capabilities of the communications device, it may not, in such circumstances, be possible for the communications device to receive data associated with both the unicast service and the multicast service simultaneously. As such, technical problems arise for communications resource allocation to communications devices receiving unicast services and multicast services in a wireless communications network. Desirably, the solutions to such technical problems should be integrated to comply with existing multicast data provisioning procedures to minimise specification changes.

Multicast Data Provisioning Procedure

Communications resource allocation for multicast services typically occurs during a multicast data provisioning procedure as explained with reference to FIGS. 5 and 6 below. Currently, only communications devices in an Radio Resource Control (RRC) connected state are configured to receive multicast services using multicast sessions. As explained with reference to FIGS. 5 and 6 below, a communications device initially in the RRC Idle state or RRC inactive state may transition to the RRC connected state to receive a multicast service in a multicast session.

Figure 5:
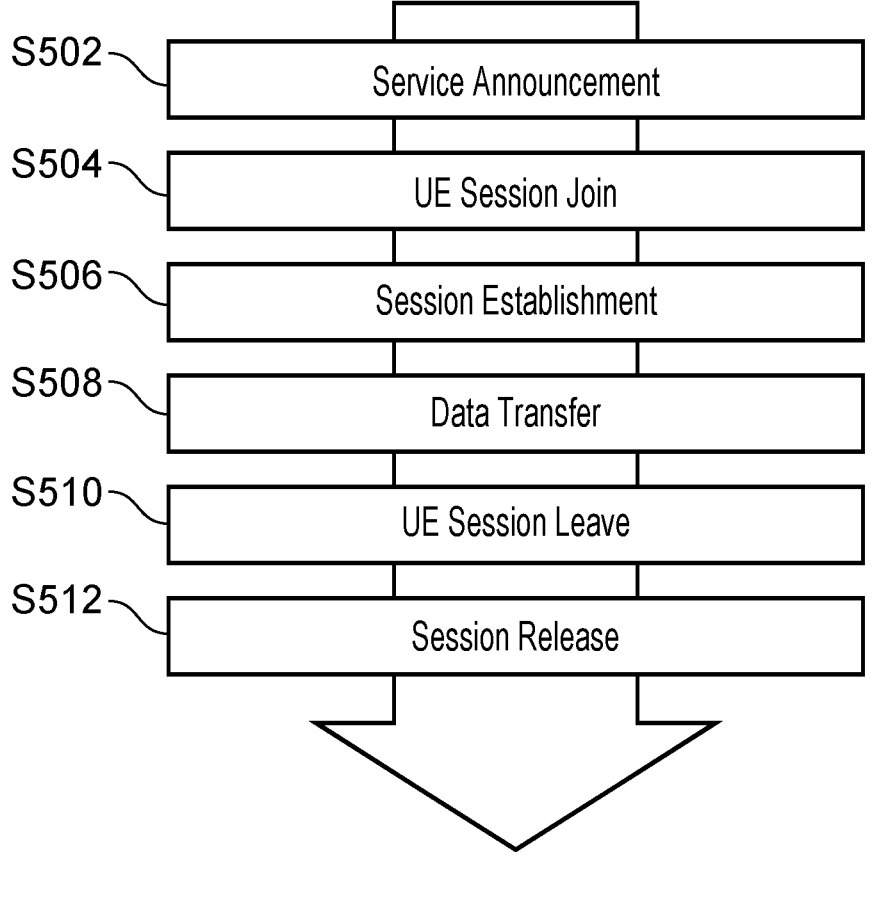
FIG. 5 is a flow diagram illustrating a typical multicast data provisioning procedure.

FIG. 5 is a flow diagram illustrating a typical multicast data provisioning procedure [4]. In step S502, a wireless communications network makes a service announcement. For example, a core network of the wireless communications network may transmit (via a gNB) a group paging or notification message to multiple communications devices within the coverage area of the gNB which are selected to receive a multicast service. The communications device may be in an RRC Idle or RRC Inactive state when receiving the group paging or notification message. In such cases, the communications devices transition to the RRC connected state in response to receiving the group paging or notification message. The service announcement may include information required for service reception such as IP multicast addresses and/or a service start time. In step S504, each of the communications devices join the multicast session. For example, the communications devices may transmit a request to join the multicast session to via a gNB to the core network which accepts the request. In step S506, communications resources are established for providing the multicast service. The multicast join and session establishment procedure explained with reference to steps S504 and S506 are explained in further detail with reference to FIG. 6 below. In step S508, the wireless communications network transmits data for the multicast service via the gNB to the communications devices forming part of the multicast session. The data may be transmitted either by Point-to-Point (PTP) or Point-to-Multipoint (PTM) communication. The gNB may determine whether to transmit the data by PTP or PTM. In step S510, one or more of the communications devices may leave the multicast session. For example, the one or more communications device may determine that they no longer want to receive the multicast service using the multicast session. In response, the wireless communications network releases the multicast session for the one or more communications devices. In step S512, the communications resources allocated for providing the multicast service are released. It will be appreciated by one skilled in the art that the above description with reference to FIG. 5 is for the purposes of presenting background information and is not an exhaustive description of current Multicast data provisioning procedures, further details of which can be found in [4] which is hereby incorporated by reference.

Figure 6:
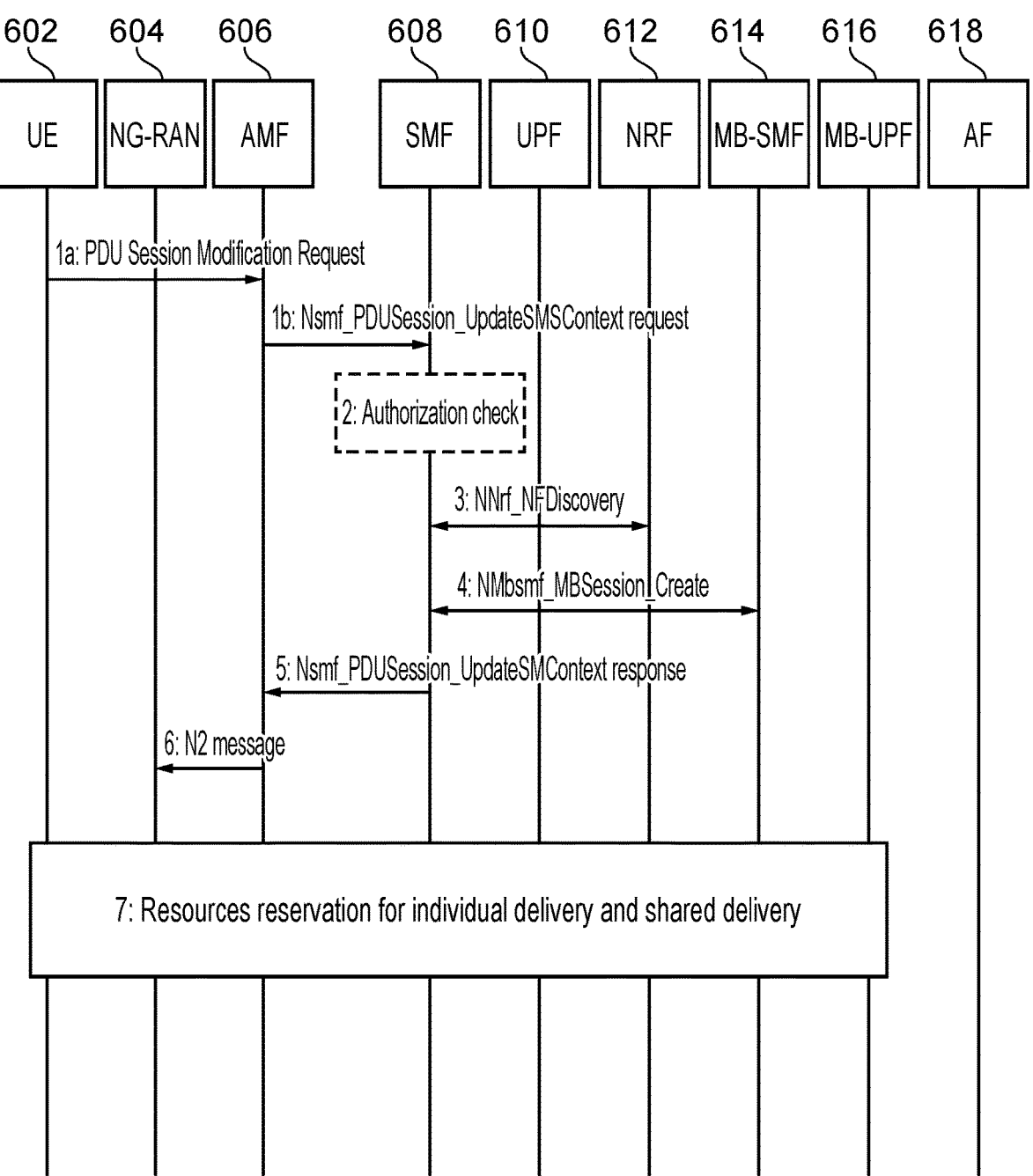
FIG. 6 is a flow diagram illustrating a multicast join and session establishment procedure.

FIG. 6 is a flow diagram illustrating a multicast join and session establishment procedure which form part of a multicast data provisioning procedure [4]. Steps 1 to 7 illustrated in FIG. 6 may occur during steps S504 and S506 of FIG. 5. FIG. 6 illustrates communications between a communications device 602 (such as a UE), a 5G Radio Access Network 604 (5G RAN), an Access Mobility and Management Function 606 (AMF), a Session Management Function 608 (SMF), a User Plane Function 610 (UPF), a Network Function Repository Function 612 (NRF), a Multicast/Broadcast Session Management Function 614 (MB-SMF), a Multicast/Broadcast User Plane Function 616 (MB-UPF) and an Application Function 618 (AP). The 5G RAN 604 may include a gNB (such as infrastructure equipment 272). The AMF 606. SMF 608. UPF 610. NRF 612. MB-SMF 614. MB-UPF 616, and the AF 618 are core network entities forming part of a core network (such as core network 276).

In step 1, the communications device 602 transmits a PDU Session Modification Request to the AMF 606 which includes an MBS session indication indicating a multicast group that the communications device 602 is seeking to join. It will be appreciated that a "multicast group" is a group of communications devices forming part of the same MBS session. In step 1b, the AMF 606 forwards the PDU session modification request to the SMF 608. In step 2. The SMF 608 checks the PDU session Modification Request for authorisation. The SMF 608 may determine from the MBS session ID that the PDU Session Modification Request is an MBS Session Join Request and authorises the MBS Session Join Request. In step 3, if the SMF 608 is not aware of multicast context information for the MBS session corresponding to the MBS session ID, the SMF 608 transmits a Nnrf_NFDiscovery request including the MBS session ID to the NRF 612 to check whether the NRF 612 is aware of the multicast context information. If the NRF 612 is aware of the multicast context information, then the NRF 612 responds to the SMF 608 with a Nnrf_NFDiscovery response. In step 4, the SMF 608 transmits a Nsmf_MBSSession_Create request to the MB-SMF 614 to retrieve multicast QoS flow information associated with the session corresponding to the MBS session ID. In step 5, the SMF 608 transmits a Nsmf_PDUSession_UpdateSMContext response to the AMF 606 including N2 SM information such as PDU Session ID. MBS Session ID. MB-SMF ID, multicast QoS flow information, updated PDU Session information, mapping between unicast QoS flow and multicast QoS flow information. The Nsmf_PDUSession_UpdateSMContext also includes an N1 container containing a PDU Session Modification Command to create MBS session context (if it does not already exist) in the 5G RAN 604, and to provide mapping information between the multicast context and the PDU session of the communications device 602 to the 5G RAN 604. The SMF 608 may map the multicast QoS information to the QoS Flow information for the PDU session. In step 6, the AMF 606 transmits an N2 message including PDU session modification command information to the 5G-RAN 604. The 5G-RAN 604 uses the MBS Session ID to determine that the PDU Session Modification command is for the MBS session corresponding to the MBS Session ID. The 5G-RAN 604 then determines communication resource allocation. If MBS session context does not exist for an MBS Session ID received by the NG-RAN 604 then the NG-RAN 604 may use the QoS information for the MBS Session to allocate communications resources for the multicast session. The NG-RAN 604 may then use the allocated communications resources for delivering data packets to the communications device 602 forming part of the MBS session. In step 7, the 5G-RAN 604, AMF 606. SMF 608, and MB-SMF 614 perform communications resource reservation for unicast and multicast services. The SMF 608 may obtain an indication of MBS capability of the 5G-RAN 604 via the received QFI information and determines the how to deliver data between the core network and the 5G-RAN 604. As mentioned above, the 5G-RAN 604 may allocate the communications device with communications resources for providing the multicast service. Such communications resources may be used for providing a group-common Physical Downlink Control Channel (PDCCH) or Physical Downlink Shared Channel (PDSCH) for example. It will be appreciated by one skilled in the art that the above description with reference to FIG. 6 is for the purposes of presenting background information and is not an exhaustive description of current multicast joining and session establishment procedures, further details of which can be found in [4] which is hereby incorporated by reference.

As explained above, it is desirable to integrate solutions to technical problems arising from communication resource allocation for communications devices receiving unicast and multicast services with existing multicast data provisioning procedures to minimise specification changes.

Currently, the 3PP group are considering the following two options as potential solutions for communications resource allocation for communications devices receiving multicast sessions in the RRC Connected state:

Option 1: First Mode of Operation

According to a first mode of operation, a communications device may be configured with a BWP which is dedicated for receiving a unicast service and another BWP which is dedicated for receiving a multicast service (such as MBS), and the BWP dedicated for receiving the unicast service may have the same numerology as the BWP dedicated for receiving the multicast service. In other words, the BWPs have the same sub-carrier spacing (SCS) and cyclic prefix (CP). It will be appreciated by one skilled in the art that if the SCS is the same for two BWPs, then the two BWPS also have the same slot duration In the first mode of operation, communications resources for the multicast service form part of the BWP dedicated for receiving the multicast service whereas communications resources for the unicast service form part of the BWP dedicated for receiving the unicast service. As explained above, communications devices may be configured to support more than one activated BWP at the same time. In such cases, the communications device can receive a unicast service from communications resources in the BWP dedicated for receiving the unicast service and can effectively receive a multicast service from communications resources in the BWP dedicated for receiving the multicast service at the same time. However, as explained above, communications devices may only be configured to support one activated BWP at the same time. For example, a reduced complexity communications device may be configured to support only one activated BWP. In such cases, the communications device may be required to switch between the BWP dedicated for receiving the unicast service and the BWP dedicated for receiving the multicast service as the communications device receives the unicast and the multicast service. Consequently, if the unicast service and the multicast service are being received by the communications device at the same time, then a communications device configured to support only one activated BWP cannot receive both services effectively. For example, the communications device may not be able to receive data from the unicast service and the multicast service which is scheduled to be received at the communications device at the same time.

Option 2: Second Mode of Operation

According to a second mode of operation, a communications device may be configured with a BWP dedicated for receiving a unicast service and the BWP dedicated for receiving the unicast service includes communications resources for providing a multicast service. For example, a "MBS Frequency Region" comprising a plurality of contiguous Physical Resource Blocks (PRBs) may be configured within the BWP dedicated for receiving the unicast service. In such cases, it may be desirable to identify a starting PRB of the plurality of PRBs and a number of the PRBs which constitute the MBS Frequency Region. The identification of the starting PRB and the number of the PRBs may be provided to a communications device to enable it to identify the communications resources providing the multicast service in the MBS Frequency Region. According to the second mode of operation, communications devices which are configured to support only one activated BWP and communications devices which are configured to support more than one activated BWP may be able to receive a unicast service and a multicast service effectively at the same time. However, there are disadvantages associated with communications devices operating in accordance with the second mode of operation. For example, as a multicast service is received by a plurality of communications devices, communications resources for the multicast service cannot be moved around if a communications device performs BWP switching for power saving purposes. In other words, since multicast communications resources are received by a plurality of communications devices, the multicast communications resources are pre-configured which means that the communications resources cannot go along with the BWP switching. This means that BWP adaptation will be lost or difficult to be supported. Furthermore, if the network attempts to schedule a multicast session in PTM mode for the plurality of communications devices, the communications resources for the multicast service will be common for each of the plurality of communications devices. However, in the second mode of operation, each of the plurality of communications devices also has a dedicated BWP for receiving a unicast service. Therefore, each dedicated BWP for receiving a unicast service for a respective one of the plurality of communications device must overlap with the common communications resources for the multicast service. This results in a significant proportion of the system bandwidth being under-utilized. This under-utilization may be avoided if the network sets each dedicated BWP for receiving a unicast service for a respective one of the plurality of communications devices to have a bandwidth equal to the system bandwidth. If each dedicated BWP for receiving a unicast service for a respective one of the plurality of communications devices has a bandwidth equal to the system bandwidth, then the second mode of operation may lead to significant power consumption at the communications device due to receiving or transmitting a large system bandwidth. There is therefore a need to provide a communications device, infrastructure equipment, and methods for improved communications resource allocation for multicast and unicast services in a wireless communications network.

Embodiments of the present technique provide a method of operating an infrastructure equipment forming part of a wireless communications network. The method comprises transmitting, by the infrastructure equipment, to one or more communications devices an indication that a multicast service can be received on communications resources of a wireless access interface provided by the wireless communications network. The indication includes an indication that the communications resources can be received either according to a first mode of operation in which the communications resources of the multicast service form part of a bandwidth part dedicated for the multicast service with a second bandwidth part dedicated for unicast transmission to or reception from a communications device, or according to a second mode of operation in which the communications resources of the multicast service form part of a bandwidth part which includes communications resources for unicast transmission to or reception from a communications device. The infrastructure equipment receives a request to establish a communications session from one of the communications devices using either the first mode of operation or the second mode of operation. The infrastructure equipment transmits data according to the multicast service via the communications resources of the wireless access interface provided for the multicast service according to either the first mode or the second mode.

Figure 7:
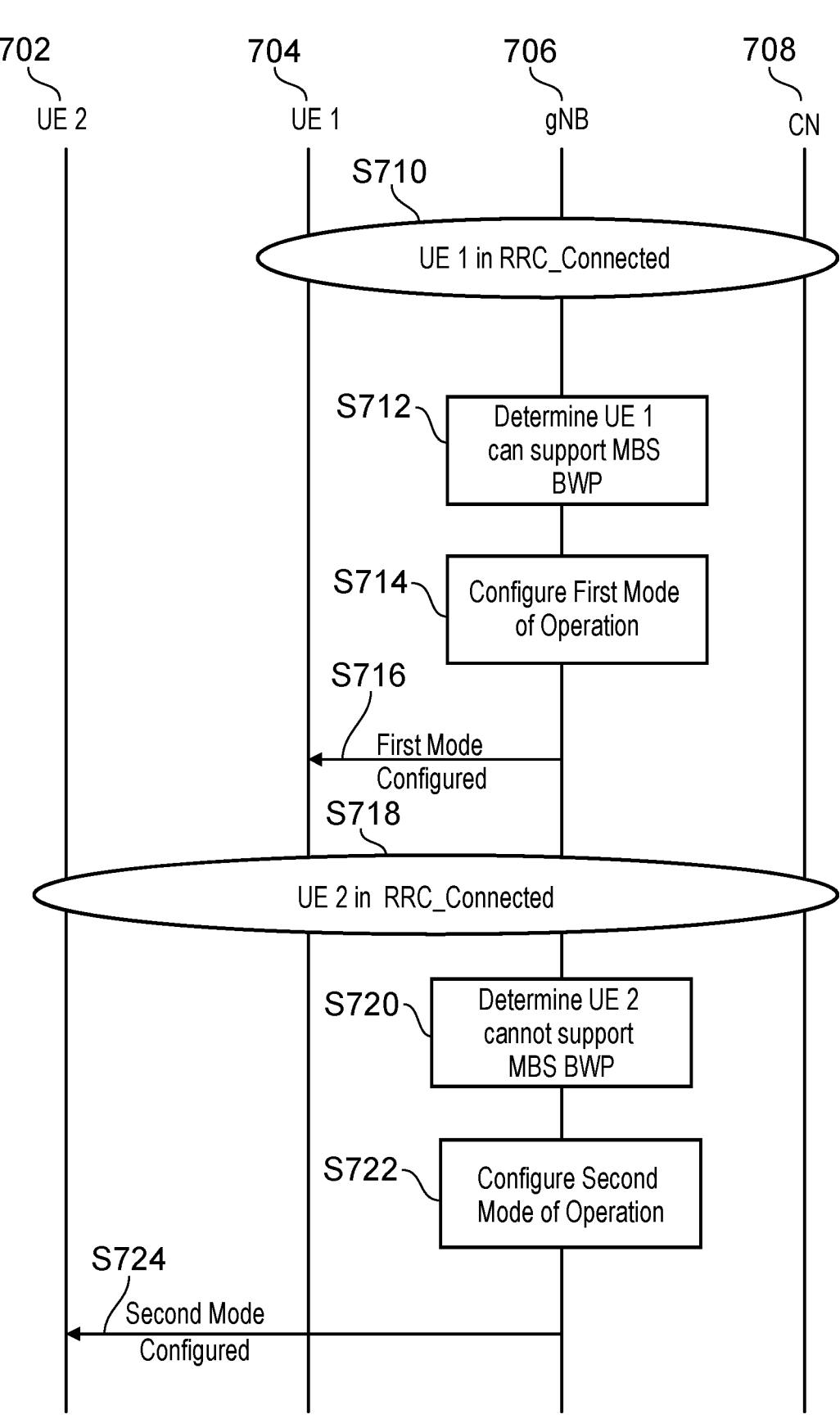
FIG. 7 illustrates a procedure for communications resource allocation for a multicast service in a wireless communications network according to example embodiments.

FIG. 7 illustrates a procedure for communications resource allocation for a multicast service in a wireless communications network according to example embodiments. FIG. 7 includes a first communications device 704, a second communications device 702, a gNB 706 and a core network 708 (CN). The first communications device 704 and the second communications device 702 are both located in a cell of the gNB 706, and are configured to receive a multicast service (such as MBS) via a multicast session to be established between the first 704 and second 702 communications devices and the core network 708. The multicast service is transmitted from the core network 708 via the gNB 706 to the first 704 and second 702 communications devices. In the example in FIG. 7, the cell of the gNB 706 is configured to support one or more communications devices, which operate in accordance with the first mode of operation and one or more other communications devices which operate in accordance with the second mode of operation.

In step S710, the first communications device 704 is in an RRC Connected state. As explained above, existing communications devices may only receive a multicast session when the communications device is in the RRC Connected state. The first communications device 704 may transition to the RRC connected state as part of the service announcement procedure S502 as explained with respect to FIG. 5. For example, the first communications device 704 may initially be in the RRC Idle state or the RRC Inactive state in which it receives a group paging or notification message from the gNB 706 which causes the first communications device 704 to transition to the RRC Connected state. In response to receiving the group paging or notification message, the first communications device 704 may transmit a request to the core network 708 via the gNB 706 to join a multicast session which provide a multicast service (as explained in S504 of FIG. 5). Alternatively, the first communications device 704 may already be in the RRC connected mode and transmits a request to the core network 708 via the gNB 706 to join a multicast session without receiving a group notification or paging message. In accordance with some example embodiments, the request to join the multicast session may include an indication that the first communications device 704 prefers to receive the multicast session in accordance with the first mode of operation In step S712, the gNB 706 determines that the first communications device 704 can support a dedicated multicast BWP. For example, the gNB 706 may determine that the first communications device 704 can support more than one activated BWP, and therefore that the communications device 704 can support both a dedicated unicast BWP and the dedicated multicast BWP. The dedicated multicast BWP may have the same numerology as the dedicated unicast BWP. In some example embodiments, the gNB 706 may make the determination based on one or more signals received from the first communications device 704 in step S710. For example, the first communications device 704 may transmit an indication to the gNB 706 in step S710 that the first communications device 704 can support a dedicated multicast BWP.

In step S714, the gNB 706 configures the first communications device 704 to operate in accordance with the first mode of operation in response to the determination that the first communications device 704 can support the dedicated multicast BWP. For example, the gNB 706 may allocate communications resources for providing the multicast service to the first communications device 704 within the dedicated multicast BWP which may have the same numerology as a dedicated unicast BWP used for providing a unicast service to the first communications device 704. In some example embodiments. Step S714 may occur during Step 7 of FIG. 6.

In step S716, the gNB 706 transmits an indication to the first communications device 704 that the first communications device 704 is configured to operate in accordance with the first mode of operation. In some embodiments, the indication may include an instruction to the first communications device 704 to operate in accordance with the first mode of operation. In some embodiments, the indication may include an indication of communications resources allocated to the first communications device 704 for receiving the multicast service. In some embodiments, the first communications device 704 may determine to operate in accordance with the first mode of operation to receive the multicast service based on the indication.

Following step S716, the first communications device 704 receives data according to the multicast service via the communications resources provided according to the first mode of operation.

In step S718, the second communications device 702 is in the RRC Connected state. The second communications device 702 may transition to the RRC connected state as part of the service announcement procedure S502 as explained with respect to FIG. 5. For example, the second communications device 702 may initially be in the RRC Idle state or the RRC Inactive state in which it receives a group paging or notification message from the gNB 706 which causes the second communications device 702 to transition to the RRC Connected state. In response to receiving the group paging or notification message, the second communications device 702 may transmit a request to the core network 708 via the gNB 706 to join a multicast session (as explained in S504 of FIG. 5). Alternatively, the second communications device 702 may already be in the RRC connected mode and transmits a request to the core network 708 via the gNB 706 to join a multicast session without receiving a group notification or paging message. In accordance with some example embodiments, the request to join the multicast session may include an indication that the second communications device 702 prefers to receive the multicast session in accordance with the second mode of operation.

In step S720, the gNB 706 determines that the second communications device 702 cannot support a dedicated multicast BWP. For example, the gNB 706 may determine that the second communications device 702 can only support one activated BWP, and therefore that the second communications device 702 can only support a dedicated unicast BWP and not a dedicated multicast BWP. For example, the second communications device 702 may have reduced receiver capabilities and is thereby only able to receive on one activated BWP at any one time. In some example embodiments, the gNB 706 may make the determination based on one or more signals received from the second communications device 702 in step S718. For example, the second communications device 702 may transmit an indication to the gNB 706 in step S718 that the second communications device 702 cannot support a dedicated multicast BWP.

In step S722, the gNB 706 configures the second communications device 702 to operate in accordance with the second mode of operation in response to the determination that the second communications device 702 cannot support the dedicated multicast BWP. For example, the gNB 706 may allocate communications resources for providing the multicast service to the second communications device 702 within a dedicated unicast BWP which is also used for providing a unicast service to the second communications device 702. In some example embodiments, step S722 may occur during Step 7 of FIG. 6.

In step S724, the gNB 706 transmits an indication to the second communications device 702 that the second communications device 702 is configured to operate in accordance with the second mode of operation. In some embodiments, the indication may include an instruction to the second communications device 702 to operate in accordance with the second mode of operation. In some embodiments, the indication may include an indication of communications resources allocated to the second communications device 702 for receiving the multicast service. In some embodiments, the second communications device 702 may determine to operate in accordance with the second mode of operation to receive the multicast service based on the indication.

Following step S724, the second communications device 702 receives data according to the multicast service via the communications resources provided according to the second mode of operation.

As explained with reference to FIG. 7, the first 704 and second 702 communications devices are located in the same cell but are configured to receive a multicast service provided by a multicast session for the cell differently, depending on the respective BWP capabilities of the first 704 and second 702 communications devices. If both of the first 704 and second 702 communications devices were configured to operate in accordance with the first mode of operation, then the second communications device 702 may not be able to operate effectively as it can only support one activated BWP. Conversely, if both of the first 704 and second 702 communications devices were configured to operate in accordance with the second mode of operation, then power consumption efficiency may be reduced as the first communications device 704 must be configured to receive across the whole of a BWP used for providing a unicast service to the first communications device 704 and the second communications device 702 must be configured to receive across the whole of a BWP used for providing a unicast service to the second communications device 702. The example embodiment explained with reference to FIG. 7 allows for flexible allocation of communications resources in accordance with the communication capabilities of communications devices within a particular cell.

In some scenarios, a cell of a gNB in which communications devices are located may only support communications devices operating according to the first mode of operation or may only support communications devices operating according to the second mode of operation. Alternatively, as in the example embodiment explained with reference to FIG. 7, the cell may support one or more communications devices operating in accordance with the first mode of operation and one or more other communications devices operating in accordance with the second mode of operation.

In accordance with example embodiments, it is therefore desirable for a gNB to inform a communications device located in a cell of the gNB whether the cell can only support the communications device if it operates in accordance with the first mode of operation, whether the cell can only support the communications device if it operates in accordance with the second mode of operation, or whether the cell can support the communications device if it operates in accordance with either the first or second modes of operation. Such example embodiments are explained with reference to FIGS. 8 and 9.

Figure 8:
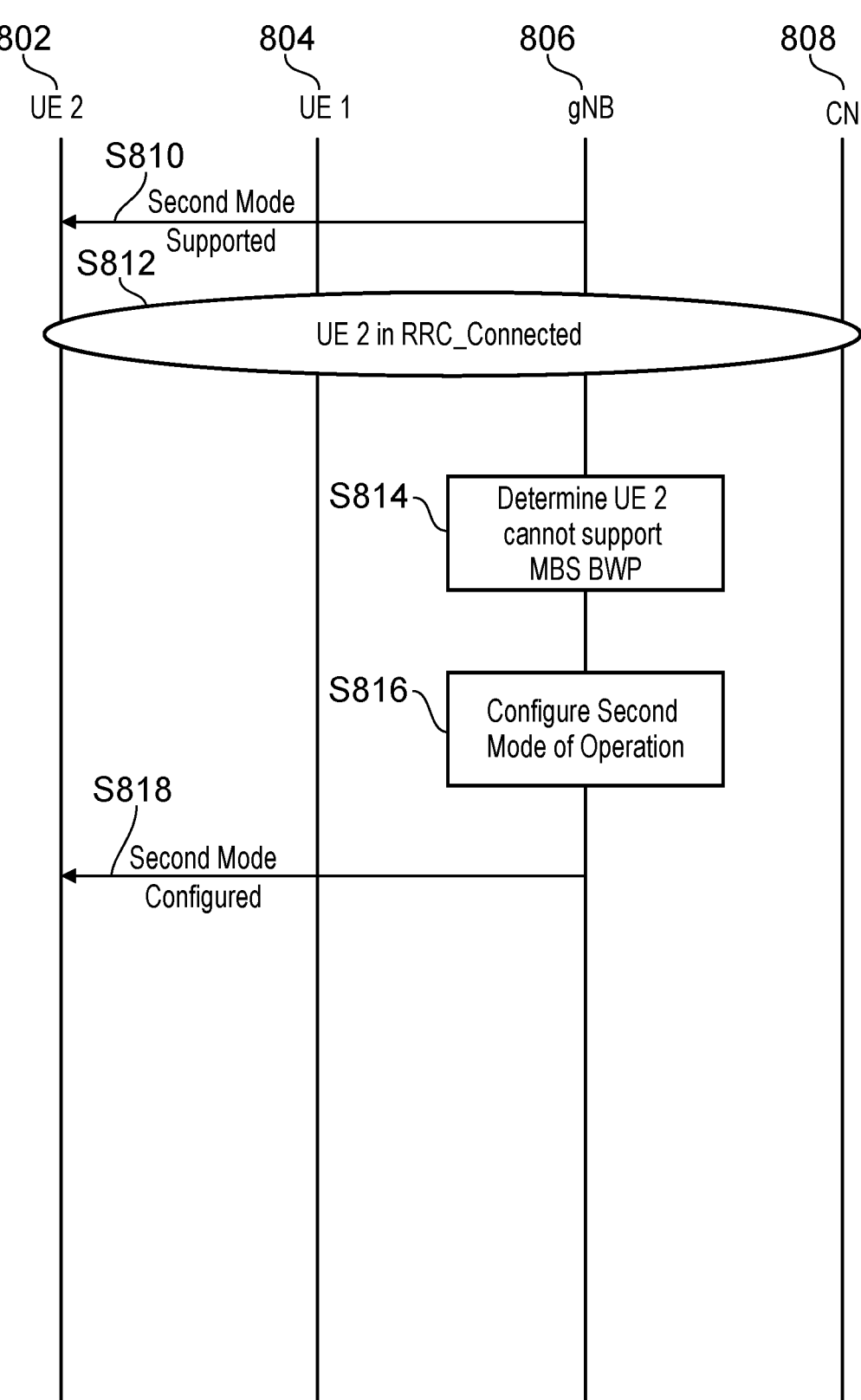
FIG. 8 illustrates a procedure for communications resource allocation for a multicast service in a wireless communications network according to example embodiments.

FIG. 8 illustrates a procedure for communications resource allocation for a multicast service in a wireless communications network according to example embodiments. FIG. 8 includes a first communications device 804, a second communications device 802, a gNB 806 and a core network 808 (CN). The first communications device 804 and the second communications device 702 are both located in a cell of the gNB 806, and are configured to receive a multicast service via a multicast session to be established between the first 804 and second 802 communications devices and the core network 808. The multicast service is received from the core network 808 via the gNB 806. In the example in FIG. 8, the cell of the gNB 806 is configured to support one or more communications devices which operate in accordance with the first mode of operation and one or more other communications devices which operate in accordance with the second mode of operation.

In step S810, the gNB 806 transmits an indication to the second communications device 802 that the cell of the gNB 806 can support the second communications device 802 operating in accordance with the second mode of operation. In some example embodiments, the indication is transmitted when the cell of the gNB 806 only supports communications devices operating according to the second mode of operation. Alternatively, as in the example described in FIG. 8, the indication is transmitted when the cell of the gNB 806 supports communications devices operating according to either the first or second mode of operation. For example, the second communications device 802 may already be aware that the cell of the gNB 806 can support the second communications device operating according to the first mode of operation, and the indication informs the second communication device 802 that the cell of the gNB 806 can also support the second communications device 802 if it operates according to the second mode of operation. In other example embodiments, the indication may include an indication that the gNB 806 can support the second communications device 802 operating according to either the first or second mode of operation. The indication may be transmitted from the gNB 806 to the second communications device 802 by broadcast signalling or dedicated signalling. As an example of transmitting the indication by dedicated signalling, the gNB 806 transmits the indication to the second communications device 802 in an RRC reconfiguration message as the second communications device 802 transitions from an RRC idle or inactive state to the RRC connected state.

In example embodiments, in response to receiving the indication that the cell of the gNB 806 can support the second communications device 802 operating in accordance with the second mode of operation, the second communications device 802 may transmit an indication to the gNB 806 that the second communications device cannot support a dedicated multicast BWP. This indication may be transmitted in S812 of FIG. 8.

In step S812, the second communications device 802 is in the RRC Connected state. It will be appreciated that step S812 may occur before step S810 in some example embodiments. In example embodiments, the gNB 806 may transmit the indication that the cell of the gNB 806 can support the second communications device 802 operating in accordance with the second mode of operation in a system information block (SIB) before the second communications device 802 has transitioned to the RRC Connected state. In other example embodiments, the indication may be transmitted by the gNB 806 to the second communications device 802 in a dedicated message to the second communications device 802 after it has transitioned to or during the transition to the RRC Connected state.

Steps S814. S816 and S818 in FIG. 8 broadly correspond to steps S720. S722. S724 in FIG. 7 respectively.

Figure 9:
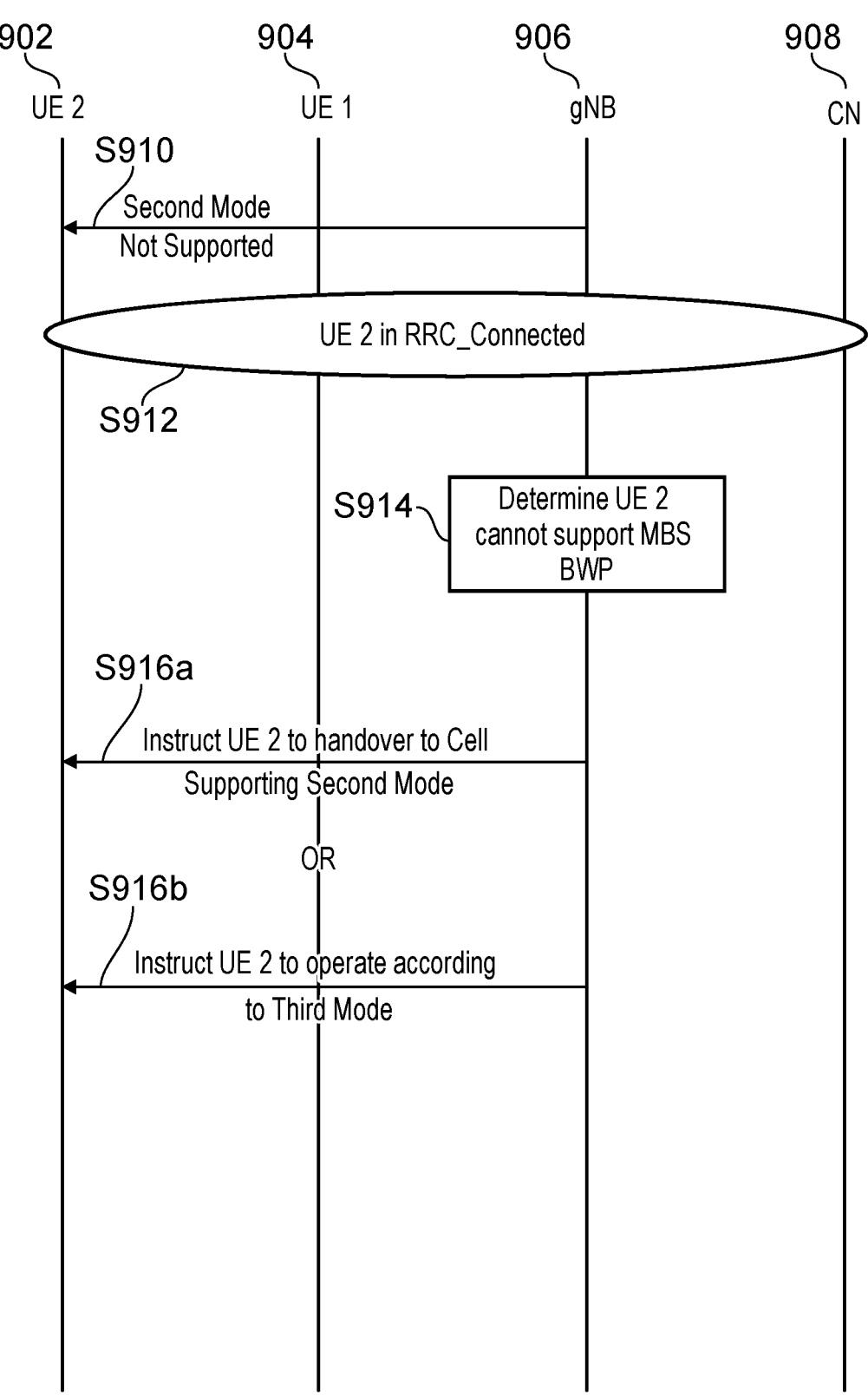
FIG. 9 illustrates a procedure for communications resource allocation for a multicast service in a wireless communications network according to example embodiments.

FIG. 9 illustrates a procedure for communications resource allocation for a multicast service in a wireless communications network according to example embodiments. FIG. 9 includes a first communications device 904, a second communications device 902, a gNB 906 and a core network 908 (CN). The first communications device 904 and the second communications device 902 are both located in a cell of the gNB 906, and are configured to receive a multicast service via a multicast session to be established between the first and second communications devices 904, 902 and the core network 908. The multicast service is received from the core network 908 via the gNB 906. In the example in FIG. 9, the cell of the gNB 906 does not support communications devices which operate in accordance with the second mode of operation.

In step S910, the gNB 906 transmits an indication to the second communications device 902 that the cell does not support the second communications device 902 operating according to the second mode of operation.

In step S912, the second communications device 902 is in the RRC Connected state. It will be appreciated that step S8912 may occur before step S910 in some example embodiments. In example embodiments, the gNB 906 may transmit the indication that the cell of the gNB 906 cannot support the second communications device 802 operating in accordance with the second mode of operation in an SIB before the second communications device 902 has transitioned to the RRC Connected state. In other example embodiments, the indication may be transmitted by the gNB 906 to the second communications device 902 in a dedicated message to the second communications device 902 after it has transitioned to or during its transition to the RRC Connected state.

In step S914, the gNB 906 determines that the second communications device 902 cannot support a dedicated multicast BWP. For example, the gNB 906 may determine that the second communications device 902 can only support one activated BWP, and therefore that the second communications device 902 can only support a dedicated unicast BWP and not a dedicated multicast BWP. The gNB 906 may make the determination based on one or more signals received from the second communications device 902 in step S912. For example, the second communications device 902 may transmit an indication to the gNB 906 in step S912 that the second communications device 902 cannot support the dedicated multicast BWP.

Following step S914, either step S916a or step S916b is performed.

In step S916a, the gNB 906, in response to the determination that the second communications device 902 cannot support the dedicated multicast BWP, transmits an instruction to the second communications device 902 to handover to another gNB which provides a cell configured to support communications devices operating in accordance with the second mode of operation.

In step S916b, the gNB 906, in response to the determination that the second communications device 902 cannot support the dedicated multicast BWP, transmits an instruction to the second communications device 902 to operate in accordance with a third mode of operation. A communications device operating according to the third mode of operation is configured with a single BWP which is dedicated for receiving a unicast service and which does not also include communications resources for receiving a multicast service. For example, the gNB 906 may release the RRC connection for the second communications device 902 and/ or transmit an RRC configuration message to the second communications device 902 to activate the BWP dedicated for the unicast service.

The steps illustrated in FIGS. 7, 8 and 9 may be integrated in any logical order with the multicast join procedure and session establishment procedure illustrated in FIG. 6.

Figure 10:
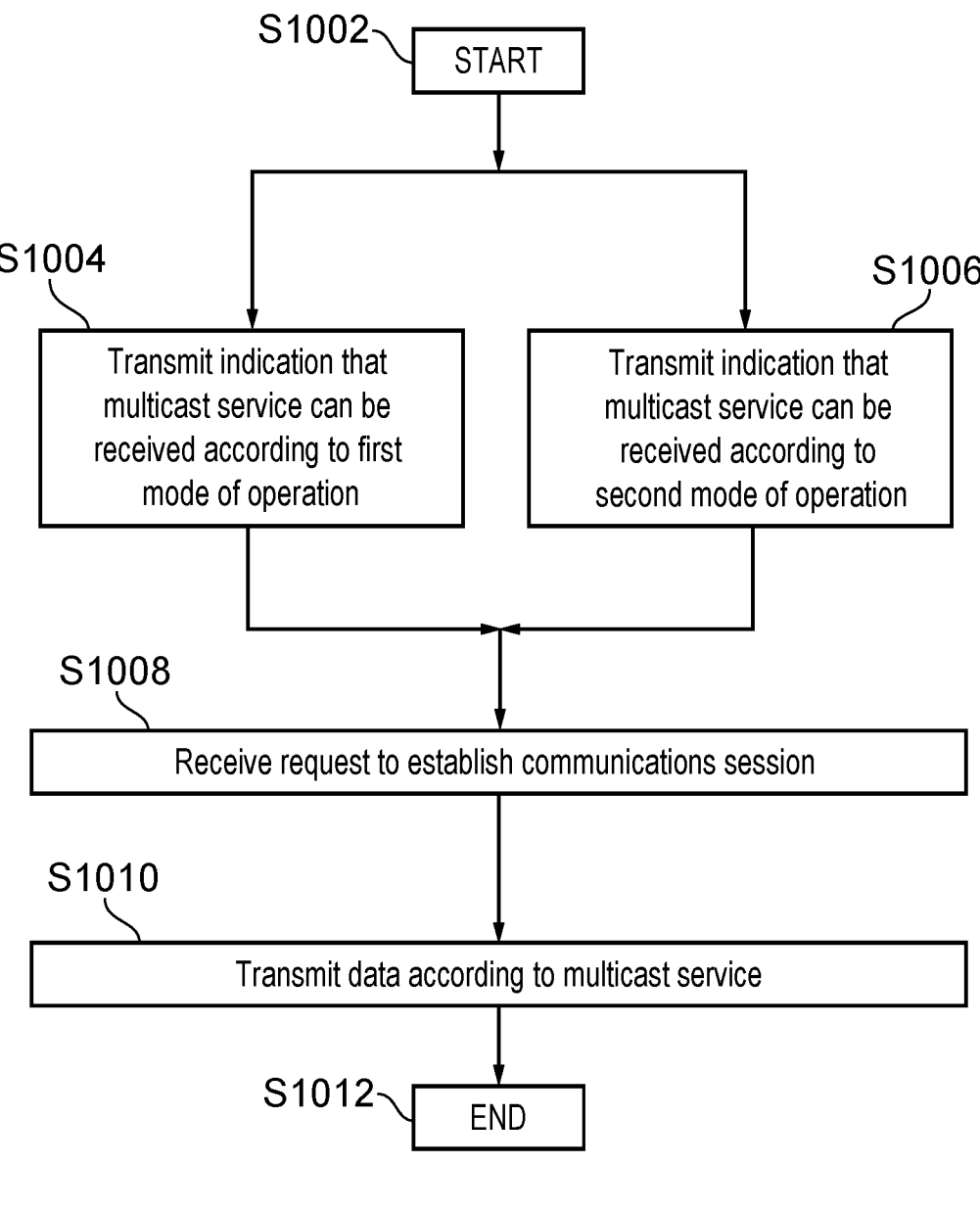
FIG. 10 illustrates a method performed by an infrastructure equipment forming part of a wireless communications network according to example embodiments.

FIG. 10 is a flow diagram illustrating a method performed by an infrastructure equipment forming part of a wireless communications network according example embodiments. The method starts in step S1002. After step S1002, the method proceeds to step S1004 or S1006.

In step S1004, the infrastructure equipment transmits to one or more communications devices an indication that a multicast service can be received on communications resources of a wireless access interface provided by the wireless communications network. The indication includes an indication that the communications resources can be received according to a first mode of operation in which the communications resources of the multicast service form part of a bandwidth part dedicated for the multicast service with a second bandwidth part dedicated for unicast transmission to or reception from a communications device. In some example embodiments, the indication may be an indication that a first of the one or more communications devices is configured to operate in accordance with the first mode of operation (for example, step S716 of FIG. 7).

In step S1006, the infrastructure equipment transmits to one or more communications devices an indication that a multicast service can be received on communications resources of a wireless access interface provided by the wireless communications network. The indication includes an indication that the communications resources can be received according to a second mode of operation in which the communications resources of the multicast service form part of a bandwidth part which includes communications resources for unicast transmission to or reception from a communications device. In some example embodiments, the indication may be an indication that a second of the one or more communications devices is configured to operate in accordance with the second mode of operation (for example, step S724 of FIG. 7).

After step S1004 or step S1006, the method proceeds to step S1008. In step S1008, the infrastructure equipment receives a request to establish a communications session from one of the communications devices using either the first mode or the second mode. In some example embodiments, one of the communications devices may transmit a request to establish a communications session as part of a multicast join procedure (for example, step S504 of FIG. 5). In some example embodiments, the request may be a request to establish a communications session using the first mode of operation if the method proceeded via step S1004 or the request may be a request to establish a communications session using the second mode of operation if the method proceeded via step S1006. In some example embodiments, the request to establish a communications session may be transmitted before step S1004 or S1006. The communications session may be a multicast session.

In step S1010, the infrastructure equipment transmits data according to the multicast service via the communications resources of the wireless access interface provided for the multicast service. In some example embodiments, the data is transmitted according to the first mode of operation if the method proceeded via step S1004 or the data is transmitted according to the second mode of operation if the method proceeded via step S1006. The multicast service may be an MBS service for example. The data may be transmitted as part of a communications session which is established in response to the request to establish a communications session in step S1008.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE. 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein.

It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will further be appreciated that the principles described herein are applicable not only to LTE-based or 5G/NR-based wireless telecommunications systems, but are applicable for any type of wireless telecommunications system in which communications resources may be arranged and configured as a plurality of frequency ranges. In particular, the principles may be applicable where communications resources within a carrier bandwidth of a cell may be arranged and configured as a plurality of frequency ranges Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating an infrastructure equipment forming part of a wireless communications network, the method comprising transmitting, by the infrastructure equipment, to one or more communications devices an indication that a multicast service can be received on communications resources of a wireless access interface provided by the wireless communications network, the indication including an indication that the communications resources can be received either according to a first mode of operation in which the communications resources of the multicast service form part of a bandwidth part dedicated for the multicast service with a second bandwidth part dedicated for unicast transmission to or reception from a communications device, or according to a second mode of operation in which the communications resources of the multicast service form part of a bandwidth part which includes communications resources for unicast transmission to or reception from a communications device, receiving, by the infrastructure equipment, a request to establish a communications session from one of the communications devices using either the first mode of operation or the second mode of operation, and transmitting, by the infrastructure equipment, data according to the multicast service via the communications resources of the wireless access interface provided for the multicast service according to either the first mode or the second mode.

Paragraph 2. A method according to paragraph 1, wherein the transmitting, by the infrastructure equipment, to one or more communications devices the indication that the multicast service can be received on communications resources of the wireless access interface provided by the wireless communications network comprises transmitting, to a first of the one or more communications devices, an indication that the communications resources of the multicast service can be received by the first communications device according to the first mode of operation; and transmitting, to a second of the one or more communications devices, an indication that the communications resources of the multicast service can be received by the second communications device according to the second mode of operation.

Paragraph 3. A method according to paragraph 2, wherein the transmitting, to the first of the one or more communications devices, the indication that the communications resources of the multicast service can be received by the first communications device according to the first mode of operation comprises determining, based on one or more signals received from the first communications device, that the first communications device can support the bandwidth part dedicated for the multicast service, configuring the first mode of operation for the first communications device, and in response, transmitting, to the first communications device, an indication that the first communications device is configured to receive the communications resources of the multicast service according to the first mode of operation.

Paragraph 4. A method according to paragraph 3, wherein the determining that the first communications device can support the bandwidth part dedicated for the multicast service, comprises determining that the first communications device can support at least two activated bandwidth parts at the same time.

Paragraph 5. A method according to paragraph 3 or 4, wherein the configuring the first mode of operation for the first communications device comprises allocating the communications resources of the multicast service in the bandwidth part dedicated for the multicast service.

Paragraph 6. A method according to any of paragraphs 3 to 5, wherein the indication that the first communications device is configured to receive the communications resources of the multicast services according to the first mode of operation includes an instruction to the first communications device to receive the communications resources of the multicast service in accordance with the first mode of operation.

Paragraph 7. A method according to any of paragraphs 2 to 6, wherein the transmitting, to the second of the one or more communications devices, the indication that the communications resources of the multicast services can be received by the second communications device according to the second mode of operation comprises determining, based on one or more signals received from the second communications device, that the second communications device cannot support the bandwidth part dedicated for the multicast service, configuring the second mode of operation for the second communications device, and in response, transmitting, to the second communications device, an indication that the second communications device is configured to receive the communications resources of the multicast service according to the second mode of operation.

Paragraph 8. A method according to paragraph 7, wherein the determining that the second communications device cannot support the bandwidth part dedicated for the multicast service, comprises determining that the second communications device cannot support more than one activated bandwidth part at the same time.

Paragraph 9. A method according to paragraph 7 or 8, wherein the configuring the second mode of operation for the second communications device comprises allocating the communications resources of the multicast service in a bandwidth part which includes communications resources for unicast transmission to or reception from the second communications device.

Paragraph 10. A method according to any of paragraphs 7 to 9, wherein the indication that the second communications device is configured to receive the communications resources of the multicast service according to the second mode of operation includes an instruction to the second communications device to receive the communications resources of the multicast services in accordance with the second mode of operation.

Paragraph 11. A method according to any of paragraphs 2 to 10, comprising determining that the infrastructure equipment can support communications devices receiving the communications resources of the multicast service according to the second mode of operation and, in response, transmitting, to the second communications device, an indication that the infrastructure equipment can support the second communications device receiving the communications resources of the multicast service in accordance with the second mode of operation.

Paragraph 12. A method according to paragraph 11, wherein the transmitting, to the second communications device, the indication that the infrastructure equipment can support the second communications device receiving the communications resources of the multicast service in accordance with the second mode of operation comprises including the indication in a Radio Resource Control (RRC) Reconfiguration Message;

transmitting the RRC Reconfiguration Message to the second communications device.

Paragraph 13. A method according to paragraph 1, wherein the wherein the transmitting, by the infrastructure equipment, to one or more communications devices the indication that the multicast service can be received on communications resources of the wireless access interface provided by the wireless communications network comprises transmitting, to the one or more communications devices, an indication that the infrastructure equipment cannot transmit the communications resources of the multicast service to the one or more communications devices in accordance with the second mode of operation:

determining that the one or more communications devices cannot support the bandwidth part dedicated for the multicast service:

configuring a third mode of operation for the one or more communications devices in which the bandwidth part dedicated for unicast transmission to or reception from the one or more communications devices does not include the communications resources of the multicast service; and transmitting an instruction to the one or more communications devices to operate in accordance with the third mode of operation.

Paragraph 14. A method according to paragraph 1, comprising transmitting, by the infrastructure equipment to one or more other communications devices, an indication that the infrastructure equipment cannot transmit the communications resources of the multicast service to the one or more communications devices in accordance with the second mode of operation:

determining that the one or more other communications devices cannot support the bandwidth part dedicated for the multicast service; and transmitting an instruction to the one or more other communications devices to handover to another infrastructure equipment to receive the multicast service.

Paragraph 15. A method according to any of paragraphs 1 to 14, wherein the bandwidth part dedicated for the multicast service and the bandwidth part dedicated for unicast transmission to or reception from a communications device have the same numerology.

Paragraph 16. A method of operating a communications device forming part of a wireless communications network, the method comprising receiving, by the communications device, from an infrastructure equipment forming part of the wireless communications network an indication that a multicast service can be received on communications resources of a wireless access interface provided by the wireless communications network, the indication including an indication that the communications resources can be received either according to a first mode of operation in which the communications resources of the multicast service form part of a bandwidth part dedicated for the multicast service with a second bandwidth part dedicated for unicast transmission to or reception from the communications device, or according to a second mode of operation in which the communications resources of the multicast service form part of a bandwidth part which includes communications resources for unicast transmission to or reception from the communications device, transmitting, by the communications device, a request to establish a communications session to the infrastructure equipment using either the first mode of operation or the second mode of operation, and receiving, by the communications device, data according to the multicast service via the communications resources of the wireless access interface provided for the multicast service according to either the first mode or the second mode.

Paragraph 17. A method according to paragraph 16, comprising transmitting an indication to the infrastructure equipment that the communications device can support at least two activated bandwidth parts at the same time.

Paragraph 18. A method according to paragraph 17, wherein the receiving, by the communications device, the indication that the multicast service can be received on communications resources of the wireless access interface provided by the wireless communications network comprises receiving, from the infrastructure equipment, an indication that the communications resources of the multicast service can be received by the communications device according to the first mode of operation.

Paragraph 19. A method according to paragraph 18, receiving, from the infrastructure equipment, the indication that the communications resources of the multicast service can be received by the communications device according to the first mode of operation comprises receiving, from the infrastructure equipment, an indication that the communications device is configured to receive the communications resources of the multicast service according to the first mode of operation.

Paragraph 20. A method according to paragraph 19, wherein the indication that the communications device is configured to receive the communications resources of the multicast services according to the first mode of operation includes an instruction to the communications device to receive the communications resources of the multicast service in accordance with the first mode of operation.

Paragraph 21. A method according to paragraph 16, comprising transmitting an indication to the infrastructure equipment that the communications device cannot support more than one activated bandwidth part at the same time.

Paragraph 22. A method according to paragraph 21, wherein the receiving, by the communications device, the indication that the multicast service can be received on communications resources of the wireless access interface provided by the wireless communications network comprises receiving, from the infrastructure equipment, an indication that the communications device is configured to receive the communications resources of the multicast service according to the second mode of operation.

Paragraph 23. A method according to paragraph 22, wherein the indication that the second communications device is configured to receive the communications resources of the multicast service according to the second mode of operation includes an instruction to the communications device to receive the communications resources of the multicast services in accordance with the second mode of operation.

Paragraph 24. A method according to any of paragraphs 16 to 23, comprising receiving, from the infrastructure equipment, an indication that the infrastructure equipment can support the communications device receiving the communications resources of the multicast service in accordance with the second mode of operation.

Paragraph 25. A method according to paragraph 24, wherein receiving, from the infrastructure equipment, the indication that the infrastructure equipment can support the communications device receiving the communications resources of the multicast service in accordance with the second mode of operation comprises receiving an RRC Reconfiguration Message from the infrastructure equipment which includes the indication that the infrastructure equipment can support the communications device receiving the communications resources of the multicast service in accordance with the second mode of operation.

Paragraph 26. A method according to paragraph 16, wherein the receiving, by the communications device, from the infrastructure equipment forming part of the wireless communications network the indication that a multicast service can be received on communications resources of the wireless access interface provided by the wireless communications network comprises receiving, from the infrastructure equipment, an indication that the infrastructure equipment cannot transmit the communications resources of the multicast service to the communications device in accordance with the second mode of operation:

receiving an instruction from the infrastructure equipment to operate in accordance with a third mode of operation in which the bandwidth part dedicated for unicast transmission to or reception from the one or more communications devices does not include the communications resources of the multicast service.

Paragraph 27. A method according to paragraph 16, wherein the receiving, by the communications device, from the infrastructure equipment forming part of the wireless communications network the indication that a multicast service can be received on communications resources of the wireless access interface provided by the wireless communications network comprises receiving, from the infrastructure equipment, an indication that the infrastructure equipment cannot transmit the communications resources of the multicast service to the communications device in accordance with the second mode of operation:

receiving an instruction from the infrastructure equipment to handover to another infrastructure equipment to receive the multicast service.

Paragraph 28. A method according to any of paragraphs 16 to 27, wherein the bandwidth part dedicated for the multicast service and the bandwidth part dedicated for unicast transmission to or reception from the communications device have the same numerology.

Paragraph 29. An infrastructure equipment forming part of a wireless communications network, the infrastructure equipment comprising transceiver circuitry configured to transmit or to receive signals:

control circuitry configured in combination with the transceiver circuitry to transmit to one or more communications devices an indication that a multicast service can be received on communications resources of a wireless access interface provided by the wireless communications network, the indication including an indication that the communications resources can be received either according to a first mode of operation in which the communications resources of the multicast service form part of a bandwidth part dedicated for the multicast service with a second bandwidth part dedicated for unicast transmission to or reception from a communications device, or according to a second mode of operation in which the communications resources of the multicast service form part of a bandwidth part which includes communications resources for unicast transmission to or reception from a communications device, receive a request to establish a communications session from one of the communications devices using either the first mode of operation or the second mode of operation, and transmit data according to the multicast service via the communications resources of the wireless access interface provided for the multicast service according to either the first mode or the second mode.

Paragraph 30. A communications device forming part of a wireless communications network, the communications device comprising transceiver circuitry configured to transmit or to receive signals:

control circuitry configured in combination with the transceiver circuitry to receive from an infrastructure equipment forming part of the wireless communications network an indication that a multicast service can be received on communications resources of a wireless access interface provided by the wireless communications network, the indication including an indication that the communications resources can be received either according to a first mode of operation in which the communications resources of the multicast service form part of a bandwidth part dedicated for the multicast service with a second bandwidth part dedicated for unicast transmission to or reception from the communications device, or according to a second mode of operation in which the communications resources of the multicast service form part of a bandwidth part which includes communications resources for unicast transmission to or reception from the communications device, transmit a request to establish a communications session to the infrastructure equipment using either the first mode of operation or the second mode of operation, and receive data according to the multicast service via the communications resources of the wireless access interface provided for the multicast service according to either the first mode or the second mode.

Paragraph 31. Circuitry for an infrastructure equipment forming part of a wireless communications network, the circuitry comprising transceiver circuitry configured to transmit or to receive signals:

control circuitry configured in combination with the transceiver circuitry to transmit to one or more communications devices an indication that a multicast service can be received on communications resources of a wireless access interface provided by the wireless communications network, the indication including an indication that the communications resources can be received either according to a first mode of operation in which the communications resources of the multicast service form part of a bandwidth part dedicated for the multicast service with a second bandwidth part dedicated for unicast transmission to or reception from a communications device, or according to a second mode of operation in which the communications resources of the multicast service form part of a bandwidth part which includes communications resources for unicast transmission to or reception from a communications device, receive a request to establish a communications session from one of the communications devices using either the first mode of operation or the second mode of operation, and transmit data according to the multicast service via the communications resources of the wireless access interface provided for the multicast service according to either the first mode or the second mode.

Paragraph 32. Circuitry for a communications device forming part of a wireless communications network, the circuitry comprising transceiver circuitry configured to transmit or to receive signals:

control circuitry configured in combination with the transceiver circuitry to receive from an infrastructure equipment forming part of the wireless communications network an indication that a multicast service can be received on communications resources of a wireless access interface provided by the wireless communications network, the indication including an indication that the communications resources can be received either according to a first mode of operation in which the communications resources of the multicast service form part of a bandwidth part dedicated for the multicast service with a second bandwidth part dedicated for unicast transmission to or reception from the communications device, or according to a second mode of operation in which the communications resources of the multicast service form part of a bandwidth part which includes communications resources for unicast transmission to or reception from the communications device.

transmit a request to establish a communications session to the infrastructure equipment using either the first mode of operation or the second mode of operation, and receive data according to the multicast service via the communications resources of the wireless access interface provided for the multicast service according to either the first mode or the second mode.

Paragraph 33. A wireless communications network comprising an infrastructure equipment according to paragraph 29;

a communications device according to paragraph 30.

Paragraph 34. A computer program comprising instructions which, when the program is executed by a computer, cause the computer to carry out the method of paragraph 1 or 16.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IOT)," 3GPP RAN #81.

[2] Holma H, and Toskala A, "LTE for UMTS OFDMA and SC-FDMA based radio access", John Wiley and Sons, 2009.

[3] 3GPP document R1-1718901, "Summary of Bandwidth Part Operation", MediaTek Inc, 3GPP TSG RAN WG1 Meeting 90bis, Prague, CZ, 9-13 Oct. 2017.

[4] 3GPP document TS 23.247, "3rd Generation Partnership Project; Technical Specification Group Services and System Aspects; Architectural enhancements for 5G multicast-broadcast services; Stage 2; (Release 17)", v0.2.0 (2021-04).

What is claimed is:

1. A method of operating an infrastructure equipment forming part of a wireless communications network, the method comprising:

transmitting, by the infrastructure equipment, to one or more communications devices an indication that a multicast service can be received on communications resources of a wireless access interface provided by the wireless communications network, the indication including an indication that the communications resources can be received either according to a first mode of operation in which the communications resources of the multicast service form part of a bandwidth part dedicated for the multicast service with a second bandwidth part dedicated for unicast transmission to or reception from a communications device, or according to a second mode of operation in which the communications resources of the multicast service form part of a bandwidth part which includes communications resources for unicast transmission to or reception from a communications device, receiving, by the infrastructure equipment, a request to establish a communications session from one of the communications devices using either the first mode of operation or the second mode of operation, and transmitting, by the infrastructure equipment, data according to the multicast service via the communications resources of the wireless access interface provided for the multicast service according to either the first mode or the second mode.

2. The method according to claim 1, wherein the transmitting, by the infrastructure equipment, to one or more communications devices the indication that the multicast service can be received on communications resources of the wireless access interface provided by the wireless communications network comprises;

transmitting, to a first communications device of the one or more communications devices, an indication that the communications resources of the multicast service can be received by the first communications device according to the first mode of operation; and transmitting, to a second communications device of the one or more communications devices, an indication that the communications resources of the multicast service can be received by the second communications device according to the second mode of operation.

3. The method according to claim 2, wherein the transmitting, to the first communications device of the one or more communications devices, the indication that the communications resources of the multicast service can be received by the first communications device according to the first mode of operation comprises;

determining, based on one or more signals received from the first communications device, that the first communications device can support the bandwidth part dedicated for the multicast service, configuring the first mode of operation for the first communications device, and in response, transmitting, to the first communications device, an indication that the first communications device is configured to receive the communications resources of the multicast service according to the first mode of operation.

4. The method according to claim 3, wherein the determining that the first communications device can support the bandwidth part dedicated for the multicast service, comprises:

determining that the first communications device can support at least two activated bandwidth parts at the same time.

5. The method according to claim 3, wherein the configuring the first mode of operation for the first communications device comprises:

allocating the communications resources of the multicast service in the bandwidth part dedicated for the multicast service.

6. The method according to claim 3, wherein the indication that the first communications device is configured to receive the communications resources of the multicast services according to the first mode of operation includes an instruction to the first communications device to receive the communications resources of the multicast service in accordance with the first mode of operation.

7. The method according to claim 2, wherein the transmitting, to the second communications device of the one or more communications devices, the indication that the communications resources of the multicast services can be received by the second communications device according to the second mode of operation comprises:

determining, based on one or more signals received from the second communications device, that the second communications device cannot support the bandwidth part dedicated for the multicast service, configuring the second mode of operation for the second communications device, and in response, transmitting, to the second communications device, an indication that the second communications device is configured to receive the communications resources of the multicast service according to the second mode of operation.

8. The method according to claim 7, wherein the determining that the second communications device cannot support the bandwidth part dedicated for the multicast service, comprises:

determining that the second communications device cannot support more than one activated bandwidth part at the same time.

9. The method according to claim 7, wherein the configuring the second mode of operation for the second communications device comprises:

allocating the communications resources of the multicast service in a bandwidth part which includes communications resources for unicast transmission to or reception from the second communications device.

10. The method according to claim 7, wherein the indication that the second communications device is configured to receive the communications resources of the multicast service according to the second mode of operation includes an instruction to the second communications device to receive the communications resources of the multicast services in accordance with the second mode of operation.

11. A method of operating a communications device forming part of a wireless communications network, the method comprising:

receiving, by the communications device, from an infrastructure equipment forming part of the wireless communications network an indication that a multicast service can be received on communications resources of a wireless access interface provided by the wireless communications network, the indication including an indication that the communications resources can be received either according to a first mode of operation in which the communications resources of the multicast service form part of a bandwidth part dedicated for the multicast service with a second bandwidth part dedicated for unicast transmission to or reception from the communications device, or according to a second mode of operation in which the communications resources of the multicast service form part of a bandwidth part which includes communications resources for unicast transmission to or reception from the communications device, transmitting, by the communications device, a request to establish a communications session to the infrastructure equipment using either the first mode of operation or the second mode of operation, and receiving, by the communications device, data according to the multicast service via the communications resources of the wireless access interface provided for the multicast service according to either the first mode or the second mode.

12. The method according to claim 11, comprising:

transmitting an indication to the infrastructure equipment that the communications device can support at least two activated bandwidth parts at the same time.

13. The method according to claim 12, wherein the receiving, by the communications device, the indication that the multicast service can be received on communications resources of the wireless access interface provided by the wireless communications network comprises:

receiving, from the infrastructure equipment, an indication that the communications resources of the multicast service can be received by the communications device according to the first mode of operation.

14. The method according to claim 13, receiving, from the infrastructure equipment, the indication that the communications resources of the multicast service can be received by the communications device according to the first mode of operation comprises:

receiving, from the infrastructure equipment, an indication that the communications device is configured to receive the communications resources of the multicast service according to the first mode of operation.

15. The method according to claim 14, wherein the indication that the communications device is configured to receive the communications resources of the multicast services according to the first mode of operation includes an instruction to the communications device to receive the communications resources of the multicast service in accordance with the first mode of operation.

16. The method according to claim 11, comprising:

transmitting an indication to the infrastructure equipment that the communications device cannot support more than one activated bandwidth part at the same time.

17. The method according to claim 16, wherein the receiving, by the communications device, the indication that the multicast service can be received on communications resources of the wireless access interface provided by the wireless communications network comprises:

receiving, from the infrastructure equipment, an indication that the communications device is configured to receive the communications resources of the multicast service according to the second mode of operation.

18. The method according to claim 17, wherein the indication that the second communications device is configured to receive the communications resources of the multicast service according to the second mode of operation includes an instruction to the communications device to receive the communications resources of the multicast services in accordance with the second mode of operation.

19. The method according to claim 11, comprising:

receiving, from the infrastructure equipment, an indication that the infrastructure equipment can support the communications device receiving the communications resources of the multicast service in accordance with the second mode of operation.

20. A communications device forming part of a wireless communications network, the communications device comprising:

transceiver circuitry configured to transmit or to receive signals;

control circuitry configured in combination with the transceiver circuitry to receive from an infrastructure equipment forming part of the wireless communications network an indication that a multicast service can be received on communications resources of a wireless access interface provided by the wireless communications network, the indication including an indication that the communications resources can be received either according to a first mode of operation in which the communications resources of the multicast service form part of a bandwidth part dedicated for the multicast service with a second bandwidth part dedicated for unicast transmission to or reception from the communications device, or according to a second mode of operation in which the communications resources of the multicast service form part of a bandwidth part which includes communications resources for unicast transmission to or reception from the communications device, transmit a request to establish a communications session to the infrastructure equipment using either the first mode of operation or the second mode of operation, and receive data according to the multicast service via the communications resources of the wireless access interface provided for the multicast service according to either the first mode or the second mode.

* * * * *